(12) United States Patent
Nielsen et al.

(10) Patent No.: US 10,031,925 B2
(45) Date of Patent: Jul. 24, 2018

(54) METHOD AND SYSTEM OF USING IMAGE RECOGNITION AND GEOLOCATION SIGNAL ANALYSIS IN THE CONSTRUCTION OF A SOCIAL MEDIA USER IDENTITY GRAPH

(71) Applicant: THINKCX TECHNOLOGIES, INC., Langley (CA)

(72) Inventors: Aaron David Nielsen, Langley (CA); Qiao Pang, Surrey (CA); Greg Mori, Burnaby (CA); Jordan Yap, Port Coquitlam (CA)

(73) Assignee: THINKCX TECHNOLOGIES, INC., Langley (CA)

( * ) Notice: Subject to any disclaimer, the term of this patent is extended or adjusted under 35 U.S.C. 154(b) by 274 days.

(21) Appl. No.: 14/884,751

(22) Filed: Oct. 15, 2015

(65) Prior Publication Data
US 2016/0117347 A1  Apr. 28, 2016

Related U.S. Application Data

(60) Provisional application No. 62/064,403, filed on Oct. 15, 2014.

(51) Int. Cl.
G06F 17/30 (2006.01)

(52) U.S. Cl.
CPC .. *G06F 17/30256* (2013.01); *G06F 17/30528* (2013.01); *G06F 17/30958* (2013.01)

(58) Field of Classification Search
CPC ......... G06F 17/30256; G06F 17/30958; G06F 17/30528

USPC ......................................................... 707/738
See application file for complete search history.

(56) References Cited

U.S. PATENT DOCUMENTS

| | | | | |
|---|---|---|---|---|
| 6,975,761 B1 * | 12/2005 | Swann | ............... | G06K 9/00463 382/173 |
| 8,019,692 B2 * | 9/2011 | Rosen | ................. | G06F 17/3087 705/319 |
| 8,095,546 B1 * | 1/2012 | Baluja | ............... | G06F 17/30958 707/750 |
| 8,316,032 B1 * | 11/2012 | Baluja | ............... | G06F 17/30864 707/749 |
| 8,352,494 B1 * | 1/2013 | Badoiu | ............. | G06F 17/30256 382/224 |

(Continued)

FOREIGN PATENT DOCUMENTS

GB          2532538 A    *  5/2016   ....... G06F 17/30035

OTHER PUBLICATIONS

Bours et al., "Face Recognition Using Separate Layers of the RGB Image", International Conference on Intelligent Information Hiding and Multimedia Signal Processing, 2008, pp. 1035-1042.*

(Continued)

*Primary Examiner* — Phuong Thao Cao
(74) *Attorney, Agent, or Firm* — Foster Pepper PLLC

(57) ABSTRACT

A social media identity/construct is created for a person by locating social media profiles of the person at least by one or both of i) recognizing image(s) in one or more social media postings related to the person and ii) correlating geolocation data embedded in one or more social media postings related to the person or the person's social media connections, analyzing, monitor social media outlets and channels to create a social media profile for the person.

20 Claims, 7 Drawing Sheets

(56) References Cited

U.S. PATENT DOCUMENTS

| | | | | |
|---|---|---|---|---|
| 8,867,849 | B1* | 10/2014 | Kirkham | G06F 17/30268 382/224 |
| 9,355,457 | B1* | 5/2016 | Kim | G06T 7/0085 |
| 9,430,629 | B1* | 8/2016 | Ziraknejad | G06F 21/32 |
| 9,690,967 | B1* | 6/2017 | Brundage | G06K 7/1417 |
| 2008/0080764 | A1* | 4/2008 | Kim | H04N 9/735 382/162 |
| 2009/0167760 | A1* | 7/2009 | Wang | G06T 17/20 345/423 |
| 2009/0251553 | A1* | 10/2009 | Cambell | G06F 3/0485 348/211.99 |
| 2010/0188580 | A1* | 7/2010 | Paschalakis | G06F 17/30802 348/571 |
| 2010/0232642 | A1* | 9/2010 | Desprez | B07C 3/14 382/101 |
| 2010/0310153 | A1* | 12/2010 | Brasnett | G06F 17/30256 382/154 |
| 2011/0038541 | A1* | 2/2011 | Bober | G06F 17/30247 382/175 |
| 2011/0158538 | A1* | 6/2011 | Iwamoto | G06F 17/30256 382/192 |
| 2011/0164822 | A1* | 7/2011 | Jegou | G06F 17/30256 382/197 |
| 2011/0170782 | A1* | 7/2011 | Iwamoto | G06F 17/30247 382/190 |
| 2011/0257985 | A1* | 10/2011 | Goldstein | G06F 17/30256 705/1.1 |
| 2011/0305399 | A1* | 12/2011 | Zitnick | G06F 17/30256 382/225 |
| 2012/0047184 | A1* | 2/2012 | Purdy | G06Q 30/0204 707/803 |
| 2012/0197709 | A1* | 8/2012 | Kendall | G06Q 30/0207 705/14.36 |
| 2012/0317198 | A1* | 12/2012 | Patton et al. | G06Q 10/10 709/204 |
| 2013/0124332 | A1* | 5/2013 | Doughty | G06Q 30/0269 705/14.66 |
| 2013/0124628 | A1* | 5/2013 | Weerasinghe | G06Q 30/0241 709/204 |
| 2013/0142418 | A1* | 6/2013 | van Zwol | G06K 9/00751 382/159 |
| 2013/0262588 | A1* | 10/2013 | Barak | H04L 67/22 709/204 |
| 2013/0266193 | A1* | 10/2013 | Tiwari | G06K 9/00771 382/115 |
| 2014/0037144 | A1* | 2/2014 | Hiramaki | G06K 9/00248 382/103 |
| 2014/0173642 | A1* | 6/2014 | Vinson | G06Q 50/01 725/9 |
| 2014/0236882 | A1* | 8/2014 | Rishe | G06F 17/30241 706/50 |
| 2014/0237467 | A1* | 8/2014 | Heddleston | G06Q 50/01 717/176 |
| 2014/0280103 | A1* | 9/2014 | Harris | G06F 17/30041 707/724 |
| 2014/0338002 | A1* | 11/2014 | Kau | G06F 17/30424 726/28 |
| 2015/0052027 | A1* | 2/2015 | Pavani | G06Q 10/087 705/28 |
| 2015/0081777 | A1* | 3/2015 | Laine | H04N 21/2665 709/203 |
| 2015/0088744 | A1* | 3/2015 | Raduchel | G06Q 20/40 705/44 |
| 2015/0109497 | A1* | 4/2015 | Tanaka | H04N 9/045 348/280 |
| 2015/0186421 | A1* | 7/2015 | Lakshman | G06F 17/30253 382/182 |
| 2015/0242891 | A1* | 8/2015 | Mimran | G06Q 30/0255 705/14.53 |
| 2015/0332087 | A1* | 11/2015 | Joshi | G06K 9/00 382/203 |
| 2015/0332588 | A1* | 11/2015 | Bulan | G08G 1/0175 348/149 |
| 2015/0339757 | A1* | 11/2015 | Aarabi | G06Q 30/06 705/12 |
| 2016/0042478 | A1* | 2/2016 | Howe | G06Q 50/16 705/26.62 |
| 2016/0117347 | A1* | 4/2016 | Nielsen | G06F 17/30256 707/738 |
| 2016/0182224 | A1* | 6/2016 | Theis | G06F 17/30247 380/28 |
| 2016/0210734 | A1* | 7/2016 | Kass | G06T 7/001 |
| 2017/0201796 | A1* | 7/2017 | Vinson | H04N 21/44222 |
| 2017/0206418 | A1* | 7/2017 | Schnittman | G06K 9/00671 |
| 2017/0263003 | A1* | 9/2017 | Feldman | G06T 7/20 |

OTHER PUBLICATIONS

Cordelli et al., "Color to Grayscale Staining Pattern Representation in IIF", The 24th International Symposium on Computer-Based Medical Systems (CBMS), 2011, 6 pages.*

Malhotra et al., "Studying User Footprints in Different Online Social Networks", 2012 IEEE/ACM International Conference on Advances in Social Networks Analysis and Mining, Aug. 26-29, 2012, pp. 1065-1070. (Year: 2012).*

* cited by examiner

Figure 2. Drill-down view of Data Merger process detailing proprietary use of geolocation data (# 21-28) and image recognition methods (#40-47)

Figure 4. Confidence scoring and successful matching of Query image and possible image matches in duplicate or near duplicate image scenario
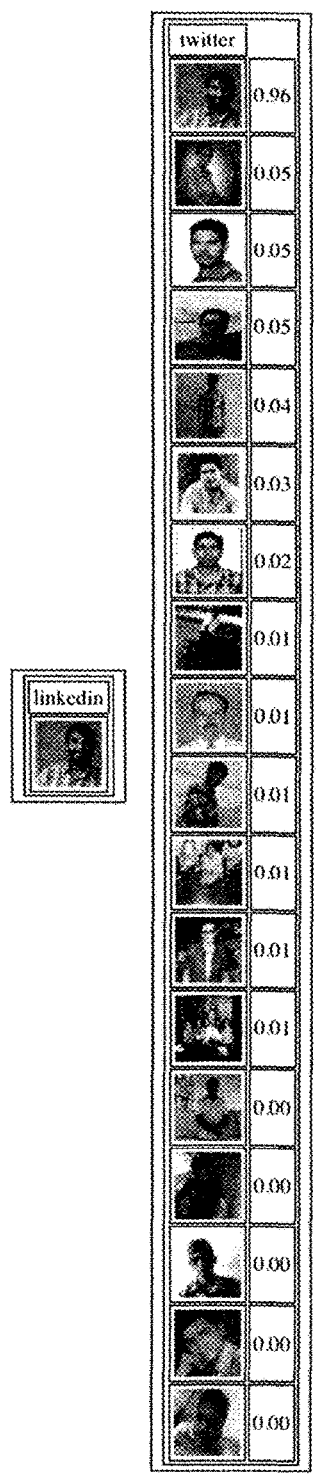

Figure 5. Confidence scoring and successful matching of Query Image and possible image matches in altered image scenario.
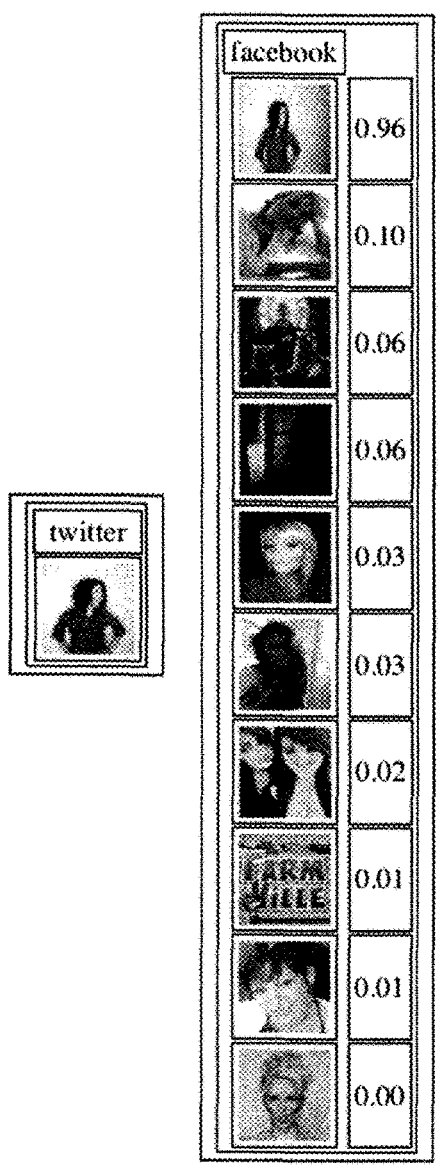

Figure 6. Delivery of social identity graph data to client via web-based interactive user interface
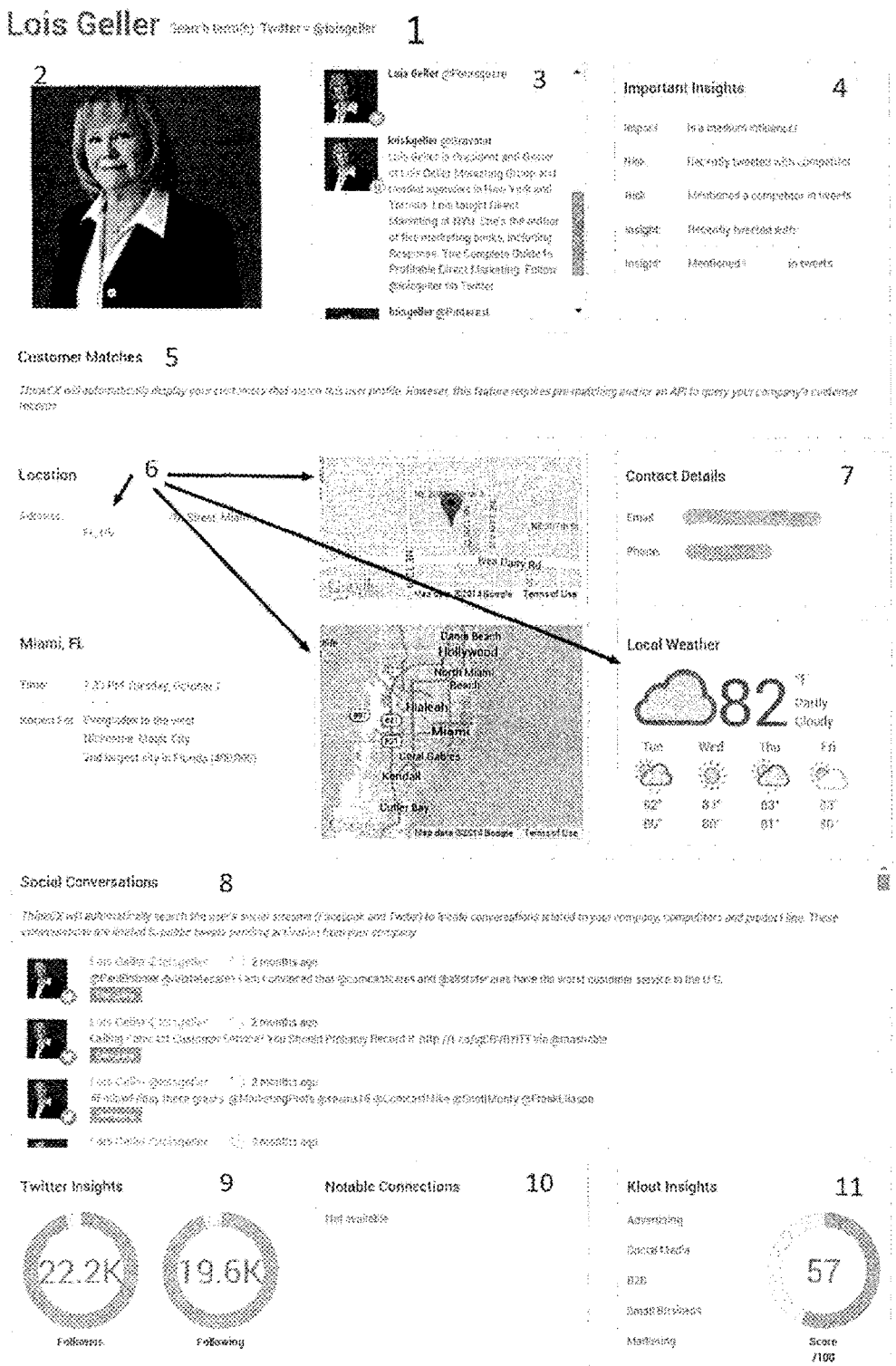

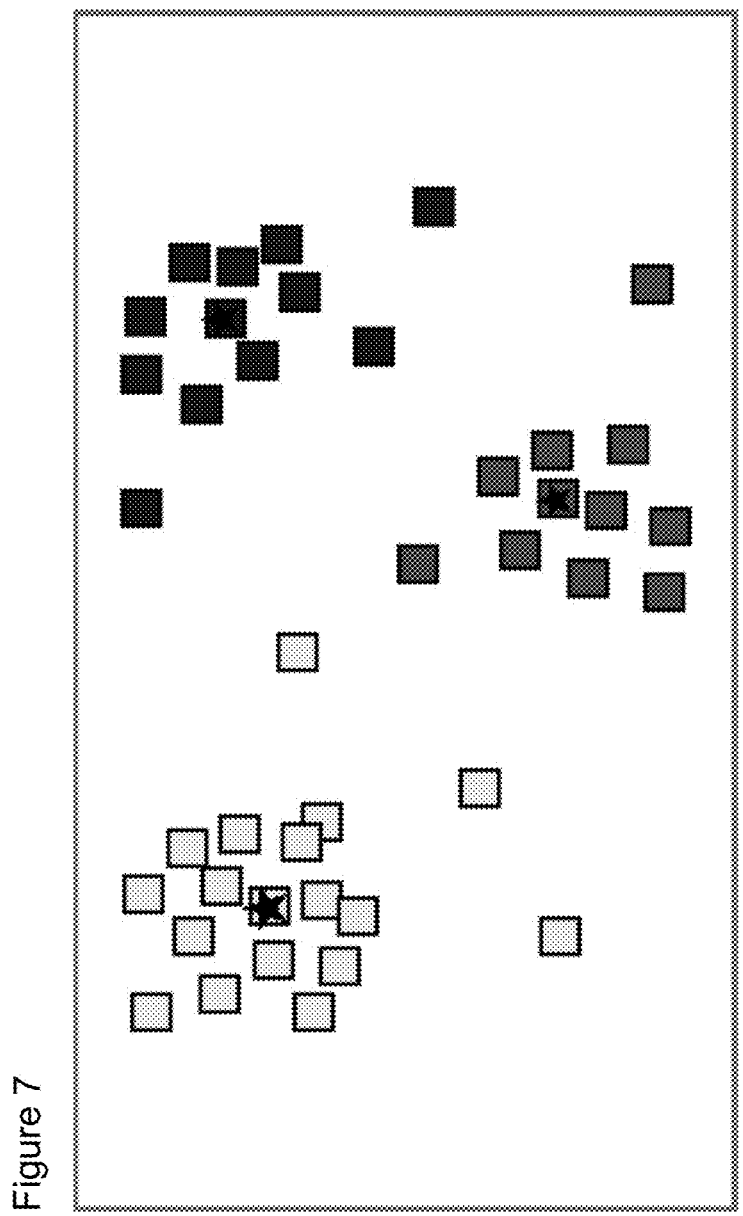

METHOD AND SYSTEM OF USING IMAGE RECOGNITION AND GEOLOCATION SIGNAL ANALYSIS IN THE CONSTRUCTION OF A SOCIAL MEDIA USER IDENTITY GRAPH

CROSS-REFERENCE TO RELATED APPLICATIONS

This application claims priority to U.S. Provisional Application No. 62/064,403, filed Oct. 15, 2014, the disclosure of which is hereby incorporated herein by reference in its entirety for all purposes.

FIELD OF THE INVENTION

This invention relates to the field of gathering business intelligence in the sphere of social media profiles.

BACKGROUND OF THE INVENTION

In the ongoing quest to better align products/services and the needs of customers, companies are increasingly developing competencies in data acquisition and analytics. Large volumes of data are gathered and analyzed for the purpose of gaining business intelligence and customer insights that allow companies to better understand the interaction between their products and the customer. These insights are also leveraged by companies to engage with their customers in a more meaningful and relevant fashion throughout the customer engagement cycle—from lead generation to the sales process, and on through the service and support phase into renewal and upsell activities.

Until recently, most of the data feeding the analytics and business intelligence machines has originated from within the organization, and thus is largely static and offline. It is generated by internal systems and employees, and is housed in large enterprise databases such as ERP and CRM systems, where it can be accessed by various groups within the organization. However, the recent run-up in popularity of social media platforms has resulted in the advent of a completely new and external source of customer data—the Internet and its myriad of sharing and networking sites. The development of sophisticated Internet search capabilities, and web hooks into various social networking platforms and web services has led many to realize that a considerable volume of customer data is available about consumers on the public World Wide Web, but organizing, filtering, and displaying that data to provide real insight and relevancy is a significant challenge.

It is an object of the present invention to obviate or mitigate some of the above disadvantages.

SUMMARY OF THE INVENTION

Embodiments of the invention include creating a social media identity/construct for a person by locating social media profiles of the person at least by one or both of i) recognizing image(s) in one or more social media postings related to the person and ii) correlating geolocation data embedded in one or more social media postings related to the person or the person's social media connections, analyzing, and monitoring social media outlets and channels to create a social media profile for the person.

In some aspects, the person is a customer of a business (providing goods and/or services to a population which may include the person) and the method of the invention supplements and/or replaces other traditional customer contact means in order to provide a more complete view of customers' experiences in relation to and interactions with the business.

The method and system of the invention provide a means to search for, locate, analyze, and display a public social profile of a person. In one aspect of the invention, as noted above, the "person" is a customer of a business or company, a user of such business or company's goods or services or a potential use of such business or company's goods or services. As such, there is provided herein a computer-implemented method and system to match a person with his or her corresponding online social profiles. The computer-implemented method and system of the invention offer distinct advantages over matching methods currently known in the art. Generally, these known methods are based on the analysis of a uniquely identifying attribute of the individual customer (such as an email address) or the combination of several more generic customer attributes (such as name, address, phone number, location) that together contribute to a narrowing of the field until a single likely result is obtained. Using these known methods, a successful match might be produced for as few as 30% of a list of customers, which is much lower than optimal for commercial usefulness. The present invention answers the demand for innovation and improvement in the space, in particular in regards to social search techniques, providing improved accuracy, and deeper social insights into the customers that businesses and companies serve. The present invention provides solutions to produce search results in circumstances when the most critical single customer data point—email address—is not available. Prior to the method and system of the invention and the advantages offered the sheer volume of online data, and dis-connectedness of the various network nodes and data sources meant that these goals and improvements were unachievable.

Within the scope of the invention, there is provided a method in which two specific social media profile attributes are maximally leveraged to improve social search match rates and build more accurate and detailed social identity graphs: i) image recognition and i) geolocation analysis, both optimally used in order to overcome the challenge of accurately locating and analyzing the public social media streams of a person (for example, a customer of a business) to provide better insights about that person (for example, a customer of the producers of products and services).

The present invention provides, in one aspect, a non-transitory computer readable medium having stored thereon computer-executable instructions, the computer executable instructions causing a processor to execute a method of creating an integrated, collated social media profile for a person which comprises:

a) probing social media outlets and channels using one or more of social media application programming interfaces (APIs), data provided by third party data compilers, data aggregated directly from web crawlers, using a selected person-specific search parameters and person specific context data to form a social media data stream;

b) from the social media stream, identifying at least one photographic image from a first social media channel and at least one photographic image from a second social media channel;

c) comparing the at least one photographic image from the first social media channel and the at least one photographic image from the second social media channel via a plurality of image recognition steps, comprising for each image: i) creating a 64 bit signature hash; ii) converting the image down to 9×8 pixels to remove unrequired details and to produce a low frequency 9×8 image to ensure that different scaling and stretching will not affect a hash; iii) converting the 9×8 image into greyscale to simplify further computation; iv) computing a greyscale colour difference between each pixel next to each other in each row of pixels, wherein each row will produce eight difference values for a total of 64 values; v) creating a 64 bit hash wherein each bit is set to 0 or 1 depending on whether the respective left pixel is brighter than the right pixel and vi) comparing two images using hamming distance to produce global image comparison output;

d) thresholding the global image comparison output to produce a set of resultant global images;

e) comparing the set of resultant global images from the first social media channel and the a set of resultant global images from the second social media channel via a plurality of image recognition steps, comprising for each image, i) identifying one or more features/keypoints; ii) assigning descriptors to the features/keypoints so that they can be recognized and compared to other images; iii) weighing the features/keypoints; iv) matching features/keypoints;

f) from the social media stream, i) identifying a plurality of geolocation data inputs related to the person and/or social media connections of the person; ii) perform a centroid-based analysis on the geolocation data points to form clusters; iii) classify and filter the clusters; and iv) select one or more probable locations of the person based upon the clusters; and g) determining and corroborating with confidence the photographic images and the geolocation data inputs which are assignable to the person and creating the collated social media profile, displayable on a dashboard, for the person.

The present invention is also generally directed to a system for identifying a person with a high degree of confidence by probing social media outlets, with a view to creating a collated social media profile for that person. A system includes a server running an application that crawls public data sources to find person specific context data and to create a social media stream with possible content relating to the person.

The system would typically include a network able to communicate with one or more social networking sites and connected to one or more databases, which may be either public or proprietary. The system would typically comprise a computing device, with a processor and memory, said processor configured to:

a) probe social media outlets and channels using one or more of social media application programming interfaces (APIs), data provided by third party data compilers, data aggregated directly from web crawlers, using a selected person-specific search parameters and person specific context data to form a social media data stream;

b) from the social media stream, identify at least one photographic image from a first social media channel and at least one photographic image from a second social media channel;

c) compare the at least one photographic image from the first social media channel and the at least one photographic image from the second social media channel via a plurality of image recognition steps, comprising for each image: i) creating a 64 bit signature hash; ii) converting the image down to 9×8 pixels to remove unrequired details and to produce a low frequency 9×8 image to ensure that different scaling and stretching will not affect a hash; iii) converting the 9×8 image into greyscale to simplify further computation; iv) computing a greyscale colour difference between each pixel next to each other in each row of pixels, wherein each row will produce eight difference values for a total of 64 values; v) creating a 64 bit hash wherein each bit is set to 0 or 1 depending on whether the respective left pixel is brighter than the right pixel and vi) comparing two images using hamming distance to produce global image comparison output;

d) threshold the global image comparison output to produce a set of resultant global images;

e) compare the set of resultant global images from the first social media channel and the a set of resultant global images from the second social media channel via a plurality of image recognition steps, comprising for each image, i) identifying one or more features/keypoints; ii) assigning descriptors to the features/keypoints so that they can be recognized and compared to other images; iii) weighing the features/keypoints; iv) matching features/keypoints;

f) from the social media stream, i) identify a plurality of geolocation data inputs related to the person and/or social media connections of the person; ii) perform a centroid-based analysis on the geolocation data points to form clusters; iii) classify and filter the clusters; and iv) select one or more probable locations of the person based upon the clusters; and g) determine and corroborate with confidence the photographic images and the geolocation data inputs which are assignable to the person and creating the collated social media profile, displayable on a dashboard, for the person.

It is to be understood that the foregoing steps of the method and system of the present invention can be performed entirely by a computing system or partly by a computing system and partly under manual human quality control review, direction and instruction.

As described above and further below, the uses and applications of the method and system of the present invention are numerous.

These and other advantages of the invention will become apparent throughout the present disclosure.

BRIEF DESCRIPTION OF THE FIGURES

FIG. 4 is a representation of an interface showing confidence scoring and successful matching of Query image and possible image matches in duplicate or near duplicate image scenario;

FIG. 5 is a representation of an interface Confidence scoring and successful matching of Query Image and possible image matches in altered image scenario;

FIG. 6 is a representation of an interface a social identity graph providing data via a web-based interactive user interface; and FIG. 7 is a graph depicting a centroid-based analysis, as employed in the geolocation method of the invention.

DETAILED DESCRIPTION OF THE INVENTION

Figure 1:
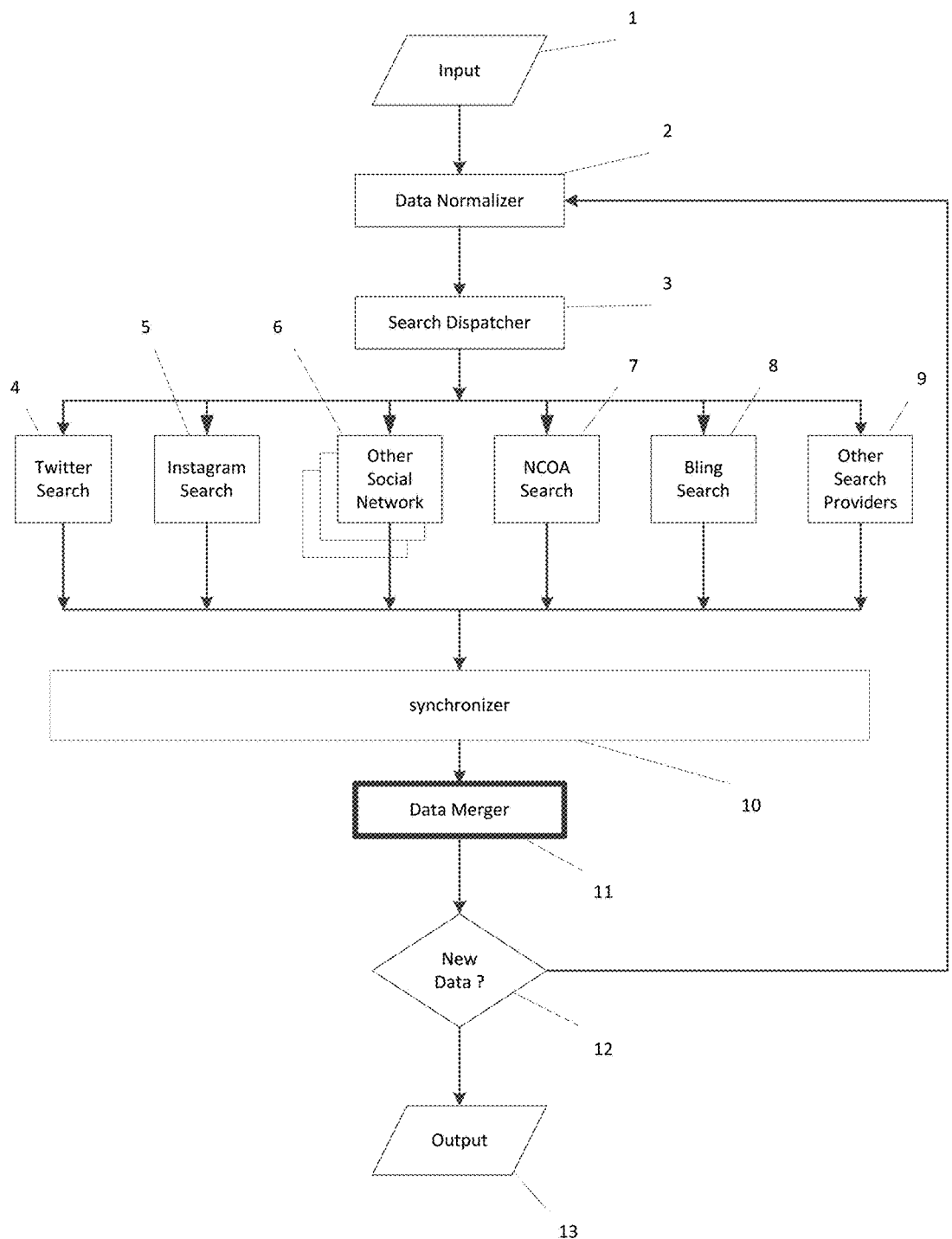
FIG. 1 is flow chart showing method of the invention, as applied as a step within an existing protocol used to identify social media users and to construct their social identity graphs.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Unless specifically stated otherwise, it is appreciated that throughout the description, discussions utilizing terms such as "processing" or "computing" or "calculating" or "determining" or "displaying" or the like, refer to the action and processes of a data processing system, or similar electronic computing device, that manipulates and transforms data represented as physical (electronic) quantities within the computer system's registers and memories into other data similarly represented as physical quantities within the computer system memories or registers or other such information storage, transmission or display devices.
The algorithms and displays with the applications described herein are not inherently related to any particular computer or other apparatus. Various general-purpose systems may be used with programs in accordance with the teachings herein, or it may prove convenient to construct more specialized apparatus to perform the required machine-implemented method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein. An embodiment of the invention may be implemented as a method or as a machine readable non-transitory storage medium that stores executable instructions that, when executed by a data processing system, causes the system to perform a method. An apparatus, such as a data processing system, can also be an embodiment of the invention. Other features of the present invention will be apparent from the accompanying drawings and from the detailed description which follows.

Terms

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

The term "device" and "mobile device" refer herein to any personal digital assistants, Smart phones, other cell phones, tablets and the like.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in a sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or machine or distributed across several devices or machines.

As used herein, a "social media outlet" may include any media outlet configured to facilitate interaction and/or the distribution of communications and/or content between one or more users. For example, social media outlets may include Internet-based applications configured to facilitate the creation and exchange of user-generated content. In some examples, social media outlets may include collaborative projects (e.g., Wikipedia), social networking sites (e.g., Myspace, Twitter, Facebook, Pinterest), media sharing sites (e.g., Flickr, YouTube), review/opinion sharing sites (e.g., Epinions, WikiAnswers), Internet forums, blogs (e.g., weblogs, social blogs, microblogs), content communities, virtual game worlds, virtual communities, and/or any other type of social media outlet. The social media outlets may be configured to facilitate the distribution of posts (e.g., wall postings, blog postings), email, instant messages, and/or any other suitable communications or other content.

As used herein, a social media "post" or "interaction" may refer to any activity or entry of content over a social media channel, for example, via voice, text, video, links to other webpage content, or by simply selecting a field, such as, to "like" or "accept a friend request" in Facebook, subscribing to a blog or signing up for tweets on Twitter. In addition to these active posts, posts or interactions may also be passive, such as, having an advertisement displayed in the user's social media account, receiving another author's post, automatic log-outs, automatic counters tracking behavior such as most recent post, etc. Similarly, a contact center "interaction" may include any communication between a customer and a live or automated contact center agent or device, which may be initiated by either party.

As used herein, a "social media connection" means, without limitation, to any friend, associate, follower, engager or associate on any social medial platform.

As used herein, the term a "grayscale" or "grey scale" means, with respect to a digital image, an image in which the value of each pixel is a single sample, that is, it carries only intensity information. Images of this sort, also known as black-and-white, are composed exclusively of shades of gray, varying from black at the weakest intensity to white at the strongest. Grayscale images are distinct from one-bit bi-tonal black-and-white images, which in the context of computer imaging are images with only the two colors, black, and white (also called bilevel or binary images). Grayscale images have many shades of gray in between. Grayscale images are also called monochromatic, denoting the presence of only one (mono) color (chrome).

Grayscale images are often the result of measuring the intensity of light at each pixel in a single band of the electromagnetic spectrum (e.g., infrared, visible light, ultraviolet, etc.), and in such cases they are monochromatic proper when only a given frequency is captured. But also they can be synthesized from a full color image. The intensity of a pixel is expressed within a given range between a minimum and a maximum, inclusive. This range is represented in an abstract way as a range from 0 (total absence, black) and 1 (total presence, white), with any fractional values in between. This notation is generally used in academic papers, but it must be noted that this does not define what "black" or "white" is in terms of colorimetry.

Another convention with regard to grayscale images is to employ percentages, so the scale is then from 0% to 100%. This is used for a more intuitive approach, but if only integer values are used, the range encompasses a total of only 101 intensities, which are insufficient to represent a broad gradient of grays. Also, the percentile notation is used in printing to denote how much ink is employed in halftoning, but then the scale is reversed, being 0% the paper white (no ink) and 100% a solid black (full ink).

In computing, although the grayscale can be computed through rational numbers, image pixels are stored in binary, quantized form. Some early grayscale monitors can only show up to sixteen (4-bit) different shades, but today grayscale images (as photographs) intended for visual display (both on screen and printed) are commonly stored with 8 bits per sampled pixel, which allows 256 different intensities (i.e., shades of gray) to be recorded, typically on a non-linear scale. The precision provided by this format is barely sufficient to avoid visible banding artifacts, but very convenient for programming due to the fact that a single pixel then occupies a single byte.

Means for the conversion of a color image to grayscale are known in the art; for example, different weighting of the color channels effectively represent the effect of shooting black-and-white film with different-colored photographic filters on the cameras. A common strategy is to match the luminance of the grayscale image to the luminance of the color image.

To convert any color to a grayscale representation of its luminance, first one must obtain the values of its red, green, and blue (RGB) primaries in linear intensity encoding, by gamma expansion. Then, add together 30% of the red value, 59% of the green value, and 11% of the blue value (see the Internet at gimp-savvy.com/BOOK/index.html?node54.html, which is hereby incorporated by reference) (these weights depend on the exact choice of the RGB primaries, but are typical). Regardless of the scale employed (0.0 to 1.0, 0 to 255, 0% to 100%, etc.), the resultant number is the desired linear luminance value; it typically needs to be gamma compressed to get back to a conventional grayscale representation. To convert a gray intensity value to RGB, all the three primary color components red, green and blue are simply set to the gray value, correcting to a different gamma if necessary.

The main reason why grayscale representations are used for identification instead of operating on color images directly is that grayscale simplifies the identity algorithm and reduces computational requirements.

As used herein, a "hash" refers to a characteristic data string (preferably, for the purposes of the present invention, a bit vector) generated from a larger data vector, and a "hash function" refers to a function that generates hashes in a systematic way from arbitrary input data vectors.

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. § 1.72(b). The title of the present application and headings of sections provided in the present application are for convenience only, and are not to be taken as limiting the disclosure in any way.

The invention can be implemented in numerous ways, including as a process, an apparatus, a system, a computer readable medium such as a computer readable storage medium or a computer network wherein program instructions are sent over optical or communication links. In this specification, these implementations, or any other form that the invention may take, may be referred to as systems or techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

The invention provides a computer-implemented method to improve the ability to search and locate user profiles on social media platforms and broaden the set of commonly used search parameters by collecting and analyzing two sources of data within public social media content that are currently not used for the purpose of social profile matching, thus moving away from a heavy reliance on email address as the primary search input. The improved search method will result in a higher match rate and the construction of a more robust and detailed social identity graph for the individual user that is posting the content. In accordance with the invention, the focused data sources are:

1. Commonalities in social media profile photos.
2. Geolocation signals embedded in social media postings.

1. Using Image Recognition in Social Media Profile Photos

Social media users often reuse social profile photos, or post identical or similar images on multiple profile sites. When a search for a customer social profile is located, in a certain number of cases the profile photo posted by the user can be compared with the profile photos posted on other social platforms to determine and corroborate common profile ownership.

The invention includes a novel method of feature matching and ranking, leveraging both existing and proprietary local image feature extraction methods, quantization, and fast hashing protocols in order to identify common images, and thus infer common profile owners across various social media platforms. A core challenge faced in social media profile image matching is the necessity to match images subjected to transformations obfuscating their matches. The method of the invention enhances and builds upon existing methodologies which increases the reliability and robustness of these transformations. The specific methods are based on local feature extraction using keypoint identification, description, matching, aggregation, and ranking procedures.

A first aspect of the method of the invention involves probing social media outlets and channels using one or more of: social media application programming interfaces (APIs), data provided by third party data compilers, data aggregated directly from web crawlers, using selected person-specific search parameters and person specific context data to form a social media data stream. Once the probe extracts social media posts in the social media data stream; one challenge is that it may be difficult to identify an author of the posts and to attribute it to the selected person of interest.

For example, each social media service may store different types of user information than the contact center, users may use pseudonyms, user names or nicknames inconsistent with names registered or recorded at the contact center, user information may become outdated over time, availability of user information may be limited by privacy settings, etc. Accordingly, to accurately identify the author of social media posts, embodiments of the invention may go beyond simply matching user data. When used herein, a user may register with an organization such as a social media organization or a customer may register with an organization such as a contact center, for example, by signing up with the organization or having an account with the organization, and thus the organization may store information associated with the user or customer.

In one aspect of the invention, image recognition methods leverage both global and local image representations.

Multimedia identification methods involve extracting one or more identifiers that in some way captures the features i) local feature point based, and iii) global pixel.

At a global level, it is preferred to use hash methodologies. While it is most preferred that distance/difference hashes are used, as explained further herein, other hashes may also be used.

Distance/Difference Hashes

A preferred approach to perceptual hashing is via a distance function wherein at least one photographic image from the first social media channel and the at least one photographic image from the second social media channel are compared via a plurality of image recognition steps, comprising for each image: creating a 64-bit signature hash; ii) converting the image down to 9×8 pixels to remove unrequired details and to produce a low frequency 9×8 image to ensure that different scaling and stretching will not affect a hash; iii) converting the 9×8 image into greyscale to simplify further computation; iv) computing a greyscale colour difference between each pixel next to each other in each row of pixels, wherein each row will produce eight difference values for a total of 64 values; v) creating a 64-bit hash wherein each bit is set to 0 or 1 depending on whether the respective left pixel is brighter than the right pixel and vi) comparing two images using hamming distance to produce global image comparison output.

Using a difference hash, a gradient direction of the image is identified This hashing method provides powerful robust results in image scaling and aspect ratio differences compared to previous standard methods. Moderate cropping was also caught by this method along with image compression.

Perceptual Hashes

Perceptual hashes is another type of image signature. Using an image as input, the perceptual hash method produces an X bit hash as output. When searching for similar images, hashes from a query image is compared against a database of image hashes. Unlike, for example, a cryptographic hash, where small changes in the input leads to huge changes in the output, perceptual hashes is closely related to each other as long as the images are similar. A common property of perceptual hash methods is that image transformations such as scaling, aspect ratio, or colour modification only results in minor hash changes which makes perceptual hashes work well for signatures used in image and video identification systems.

Average Hash

Perhaps the simplest implementation of a perceptual hash method is the average hash function. High and low frequencies are terms used in image technology. When an image consists of high frequencies it means that the pixels in the image changes rapidly, this translates to high quality images with lots of details. When an image consist of low frequencies it means that the pixels in the image changes slowly, this translates to low quality and little details. Low frequency images therefore often only shows the structure of the image. The average hash method uses low frequency images in order to create a 64-bit signature hash in the following way: i) Convert the image down to 8×8 pixels. This will remove a lot of details, and result in a low frequency image with 64 total pixels. ii) convert the 8×8 image into greyscale. The result is now a black and white photo. This is done to simplify calculation in the next step. Instead of dealing with three colours for each; iii) compute the mean value for all pixels; iv) create a 64-bit hash where each bit is set to 0 or 1 depending on whether the greyscale value is above or below the mean value. This 64-bit hash is now a signature for the original photograph because the average hash is computed from a 8×8 pixel image, scaling and aspect ratio will not affect the hash. Other transformations will alter the hash slightly. Comparing two image signatures can be done using normal hamming distance calculation. A distance closer to zero means a higher similarity and vice versa.

pHash

A more complex perceptual hashing algorithm is the pHash implementation. While still relying on averages like average hash, pHash uses Discrete Cosine Transform (DCT) to reduce the image down to a manageable greyscale image. DCT is a common transform used for image compression. By converting the image into the frequency spectrum, it becomes easier to throw away information (compression). pHash uses the following steps to create a 64-bit signature hash: i) convert the image down to 32×32 pixels in order to simplify the DCT computation; ii) compute the DCT of the 32×32 image, resulting in a 32×32 collection of frequency scalars; iii) take the top left 8×8 scalars and disregard the rest as the top left represents the lowest frequencies in the photo; iv) compute the mean average of the DCT scalar collection; and v) create a 64-bit hash where each bit is set to 0 or 1 depending on whether each of the 64 DCT scalars is above or below the mean value. pHash is more robust than average hash against transformation such as gamma and colour changes. Just like average hashes, pHashes can be compared using hamming distance.

Local Image Feature Extraction

The process of matching two images by finding points of interest (also called feature points) that correspond to one another is employed herein, as part of the method of the invention. There are a number of feature detectors and descriptors, including the popular Scale Invariant Feature Transform (SIFT), its successor Speeded Up Robust Features (SURF) and the affine invariant Maximally Stable Extremal Regions (MSER).

The second aspect of the method of the invention includes encoding the structure of an image by describing the neighbourhood around various interest points selected in the image, also known as determining local image features. Obtaining local image features is accomplished through a two-step process: finding keypoints in an image and then describing each keypoint in a way that allows for the comparison of them. The first step in obtaining image features is feature detection; the selection of keypoints in an image. The identified keypoints are returned in the same location regardless of image scale, orientation, lighting, etc. Each keypoint is then described by the neighborhood of pixels around it in a way that it can be recognized and compared if encountered in another image (see FIG. 3). The method that is the subject of this application uses a combination of two existing feature extraction techniques, MSER for feature detection and BRISK (Binary Robust Invariant Scalable Keypoints) for keypoint describing.

More specifically, MSER is used to find correspondences between image elements from two images with different viewpoints. The method of extracting a comprehensive number of corresponding image elements contributes to the wide-baseline matching, and its use in object recognition methods and protocols.

Generally, a first step in matching features is to reliably locate points or areas of interest aka MSERs. See, J. Matas, O. Chum, M. Urban, and T. Pajdla, "Robust wide baseline stereo from maximally stable extremal regions," In British Machine Vision Conference, pages 384-393, 2002, which is hereby incorporated by reference. Features may be shapes rather than points or corners. This detector can be described in simple terms using its similarity to the watershed algorithm for image intensities. See, L. Vincent and P. Soille, "Watersheds in digital spaces: an efficient algorithm based on immersion simulations," Pattern Analysis and Machine Intelligence, IEEE Transactions on, 13(6):583-598, June 1991, which is hereby incorporated by reference. For example, in an image representing a terrain viewed from above, where black areas are low ground and white areas are high ground, if the terrain is slowly flooded, certain areas will collect water in such a way that the pool does not change shape for some time. These areas are considered to be the most stable and are chosen as features. When combined with certain descriptors, MSERs perform well for changes in illumination between images.

Decomposing an image into local regions of interest or 'features' is an aspect of the invention and used herein. The ideal keypoint detector finds salient image regions such that they are repeatably detected despite change of viewpoint; more generally it is robust to all possible image transformations. Similarly, the ideal keypoint descriptor captures the most important and distinctive information content enclosed in the detected salient regions, such that the same structure can be recognized if encountered.

The inherent difficulty in extracting suitable features from an image lies in balancing two competing goals: high quality description and low computational requirements: This is where the method of the invention combines elements of MSER with the Binary Robust Invariant Scalable Keypoint ("BRISK") methodology.

A sampling pattern consisting of 1 points lying on appropriately scaled concentric circles is applied at the neighborhood of each keypoint to retrieve gray values: processing local intensity gradients, the feature characteristic direction is determined. Finally, the oriented BRISK sampling pattern is used to obtain pairwise brightness comparison results which are assembled into the binary BRISK descriptor. Once generated, the BRISK keypoints can be matched very efficiently thanks to the binary nature of the descriptor.

The key stages in BRISK comprise: i) feature detection; ii) descriptor composition and iii) keypoint matching, Given a set of keypoints (consisting of sub-pixel refined image locations and associated floating-point scale values), the BRISK descriptor is composed as a binary string by concatenating the results of simple brightness comparison tests. In BRISK, we identify the characteristic direction of each keypoint to allow for orientation-normalized descriptors and hence achieve rotation invariance which is key to general robustness. Also, we carefully select the brightness comparisons with the focus on maximizing descriptiveness.

The key concept of the BRISK descriptor makes use of a pattern used for sampling the neighborhood of the keypoint. While the descriptor is also assembled via brightness comparisons, BRISK has some fundamental differences apart from the obvious pre-scaling and pre-rotation of the sampling pattern. Firstly, BRISK uses a deterministic sampling pattern resulting in a uniform sampling-point density at a given radius around the keypoint. Consequently, the tailored Gaussian smoothing will not accidentally distort the information content of a brightness comparison by blurring two close sampling-points in a comparison. Furthermore, BRISK uses dramatically fewer sampling-points than pairwise comparisons (i.e., a single point participates in more comparisons), limiting the complexity of looking up intensity values. See S. Leutenegger, M. Chli, and R. Siegwart, "BRISK: Binary Robust Invariant Scalable Keypoints," 2011 IEEE international Conference on Computer Vision (ICCV), Barcelona, S P, 2011, pp. 2548-2555, the contents of which are incorporated herein by reference.

In regards to descriptor matching, the method of the invention provides for matching two BRISK descriptors as a simple computation of their Hamming distance (M. Calonder, V. Lepetit, C. Strecha, and P. Fua, "BRIEF: Binary Robust Independent Elementary Features," In Proceedings of the European Conference on Computer Vision (ECCV), 2010, which is hereby incorporated by reference) wherein the number of bits different in the two descriptors is a measure of their dissimilarity.

In order to increase robustness to image modifications common in social media profile photographs, a novel feature matching and weighting algorithm was developed. Comparisons between all descriptors in a pair of image are conducted. These distances are sorted according to Hamming distance. An overall score for the image is determined by first sorting all the distances in ascending order then computing:

$$s = \sum_{n=0}^{N} w(n)d(n)$$

where a sigmoid weighting is applied to these distances to emphasize the effect of top scoring close matches, while limiting the nuisance effects of large outlier match distances:

$$w(n) = \frac{1}{1 + \exp(5 - 2n)}$$

This ordinal ranking sigmoid approach results in a more accurate match distance computation. To convert this weighted average distance into a probability of match, we obtain a probabilistic output via another sigmoid mapping:

$$P(\text{match} \mid s) = \frac{1}{1 + \exp(As + B)}$$

SIFT (Scale-Invariant Feature Transformation) is regarded as one of the highest quality existing algorithms available for obtaining good image features, and serves as a good benchmark for image recognition efficacy. In our tests conducted on a dataset of 900 sample images, the new algorithm was able to significantly outperform the SIFT algorithm.

In some cases, the profile photo submitted by a user on one site is an exact or near duplicate of the photo submitted on a different site(s). Recognition of duplicate or near duplicate images from a reference Query Image in these cases is fairly straightforward (see FIG. 4). In other cases there is the additional challenge of images that are cropped, re-sized, compressed, colorized or otherwise modified from the original Query Image when photos are uploaded to social platforms. However, our proprietary algorithm also exceeds commercial standards in discerning image commonalities in cases where identical photos have been altered by automated or manual photo editors (see FIG. 5). This increases the likelihood of locating multiple social data sources for any given social media profile owner, and increases the volume of accessible data that can be used to build their social identity graph.

2. Using Geolocation Signals Embedded in Social Postings

Existing social profile search and match techniques rely heavily on the presence of email address as the starting point, but in many cases email addresses are not available, are not correct, or even if they are valid are nonetheless different than the email address used to register a particular social media account. In conjunction with the image recognition algorithm described above, the invention also incorporates an innovative and proprietary geolocation algorithm that extracts location data from a variety of sources, analyzes, and cross-references that stream for corroborating data to support the identification of social media users when the relevant email address is not available.

The geolocation data inputs related to the person include (but are not limited to):

EXIF geotag data from one or more publicly posted photos.

Data from websites such as Instagram and Twitter that append geo. coordinates in the meta data of the user post if geo tracking is enabled on the user's device.

Third party social media sites such as Foursquare that append location data to user posts.

Social media users that include their phone numbers in profiles, bios, or posts.

Social media users that include location data in profiles, bios, or posts.

Within the scope of the invention, geolocation data inputs may comprise artifacts selected from the group comprising one or more online profiles of the person, online social media posts of the person, images (photographic and video) posted online of or by the person, one or more online profiles of a social media connection of the person, online social media posts of a social media connection of the person, images (photographic and video) posted online of or by a social media connection of the person.

The data streams arising from these geolocation data inputs are analyzed and cross-referenced with at least one time cue and/or spatial cue which include (but not limited to): time of day that a given post was made, post clustering, outlier extractions (e.g., posts made while a person is traveling away from home), and natural language analysis for location clues (e.g., a post that states that the poster is "settling in at home to watch a movie"). In addition, an analysis of the user's social networks is performed to determine the probability of relatives or associates residing in the same location.

This geolocation data inputs related to the person cross-referenced with other time cues and/or spatial cues is then summarized to produce short lists of possible locations for the person and optionally his/her known relatives or associates. Each possible location on the short list is then triangulated against data sources including (but not limited to):

Address information for the person known by the business.

National Change of Address database.

Address registries.

Marriage registries.

General web searches.

Third party vendors such as Yellow Pages.

Other online and offline data sources.

The outputs of this triangulation step (most probable home address and most probable phone number) are scored and subjected to analysis against a confidence threshold before being displayed as outputs. The results may then optionally be looped back into the existing search process as part of a recursive loop (see FIG. 1), or as outputs used to match a person's social identity to a specific customer profile in the business database.

Individually, and in combination, the two component methods of the invention are effective in:

Improving the success rate when searching for social media profiles, especially in the absence of a valid email address.

Linking offline and online data sources.

Connecting social media profiles with specific customers in an enterprise's customer database.

Building out a detailed social identity graph for individual social media users.

Providing companies with rich insights about their products, services, and customers.

The search and social identity graph data generated by the invention is merged with data obtained through existing processes and is sent to and used by the business via various methods, including (but not limited to):

An interactive web-based user interface (see FIG. 6).

Application Programming Interface (API).

Geolocation Data Sources

With the scope of the method of the invention, there are at least two primary geolocation data sources:

Artifacts from one or more online profiles of the person, online biographic information of the person, online posts, via social media channels and platforms generated by or about the person, photographic and/or video images posted by or about the person; and Artifacts of the one or more online profiles of social connections of the person, online biographic information of social connections of the person, online posts social connections of the person, via social media channels and platforms generated about the person by social connection of the person, photographic and/or video images posted by social connection of the person (the "artifacts").

Within the method of the invention, the artifacts, specifically geolocation data from artifacts of the person when available and collectable, otherwise artifacts of the person's most related social contacts are gathered and collected for further geolocation processing.

Many applications, including search engines, try to adapt the services they offer to the current location of a user. This requires that resources (e.g., web pages in the case of search engines) be associated with a geographic scope. Such geographic information can be obtained in various ways. One way of learning information about location i.e., "places" is to gather data and artifacts from sources which encourage users to explicitly share information about their whereabouts with their friends and contacts. This is the case with Foursquare, on which users can compete with each other for points they earn for each "check-in" at a certain place, or Twitter where the user's current location can be attached to his/her tweet. Further, a source of geographical information and artifacts are Gazetteers (for example, GeoNames or Yahoo! or Geoplanet. These are essentially lists or indexes containing information about a large number of known places, described by different features such as geographical coordinates and semantic types.

Automatically obtained geographic knowledge enables the estimation of geographical coordinates for, for example, Flickr photos and videos, using only the textual information from their Flickr tags. To this end, a classifier is trained from the tags of Flickr photos with known coordinates (i.e., the location where the photo was taken), which is capable of selecting the area in which a previously unseen photo or video has most likely been taken.

As the amount of user-contributed textual data on the Web is growing every day (for example, by means of status updates on social networks, comments, reviews, ratings, blog posts, tagged photo and video uploads, to name a few), and as many of those contributions also now include geographical coordinates, there is a vast amount of textual information available for automated mining of geographical knowledge which can be used as geolocation artifacts within the scope of the invention. This second prong of the method of the invention capitalizes on this data and the use along or specifically with the image recognition processes described herein. While not intending to be so bound, the method of the invention represents the first application of a coordinated use of image recognition processes and geolocation processes, in the identification of a person via a plurality data streams from social media platforms, and in then using the identification, achieved with a high degree of confidence to collect and aggregate, display data relating to the person's social media profile on one easy to view dashboard.

Most existing approaches for "geolocation" identification are based on clustering, in one way or another, to convert the task into a classification problem. For instance, locations of unseen resources are determined using mean shift clustering, a non-parametric clustering technique from the field of image segmentation. The advantage of this clustering method is that an optimal number of clusters is determined automatically, requiring only an estimate of the scale of interest.

In one aspect of the invention, the method employs geolocation data sources (and artifacts) from the Web purely based on textual meta-data. Given an unseen resource x described by a certain set of tags T, a location is estimated based on the information contained in T. In particular, the scenario of estimating the location (i.e. in actual latitude/longitude coordinates) of Flickr photos, may be based on the tags associated with them.

Meta-data is a key artifact used in accordance with the invention. For example, in Flickr photos, for each photo that is uploaded to its website, the social network maintains several types of metadata, which can be obtained via a publicly available API. Various types of meta-data may be used: descriptive tags that have been provided by the photo owners, the user's location (as provided by the user in her profile as free text, e.g., "Vancouver, BC"), and information about where the photos were taken. The location information includes a geographical coordinate (latitude and longitude), and information about the accuracy of the location, encoded as a number between 1 (world-level) and 16 (street-level).

In one aspect, in regards to images on the Web, the method of the invention comprises filtering images without tags or with invalid co-ordinates and eliminate duplicate images (for example, those taken on the same day) and using those images that remain in location clustering, as described further herein.

Geolocation Methodology

In one preferred aspect of the invention, there are three steps in calculating a geolocation of a person using collected artifacts, as defined above:

1. Location Clustering.

A centroid-based cluster analysis is performed, using a k-medoids algorithm, on the geolocations extracted from the artifacts. K-medoids clustering Partitioning Around Medoids (PAM) or k-medoids is a clustering technique closely related to the well-known k-means algorithm. The algorithm, which is iterative, partitions the data into groups of data points while the objective is to minimize the squared error, which is the sum of the distances between each individual point in a cluster and the cluster center (the medoid). The k-medoids algorithm is more robust to noise and outliers than k-means. Distances are calculated using the geodesic (great-circle) distance measure as depicted in FIG. 7.

2. Timestamp Cross-Referencing and Cluster Classifying

After the clusters of the geolocations have been identified, the timestamp information of the cluster is analyzed. Most artifacts have timestamp information and by analyzing the timestamp a geolocation can be classified as "Work" or "Home" cluster based on time of the day and day of the week of the timestamp. By checking the timespan of the all the timestamps within a cluster, a cluster is classified as "Temporary" or "Permanent" location. "Temporary" clusters are filtered out and a "work" cluster and "home" cluster are picked having a maximum number of points existing in the cluster.

3. Most Probable Geolocation in Cluster Selecting

The last step is to select the best geolocation point in the clusters identified in step 2. As k-medoids algorithm is preferably used for location clustering, the best geolocation point of the cluster from the step 1 is generally well-defined.

In one aspect of the invention, geolocation data is collected from artifacts and preferably such data includes location coordinates and time stamps respectively associated with the location coordinates. Location data may be filtered based on age and accuracy or precision of the location coordinates. The location data is then partitioned based on the location coordinates into a plurality of clusters including a plurality of location data instances. The plurality of clusters are filtered based on a number of data instances in a particular cluster and a period of time over which data instances of the particular data cluster are generated as indicated by respective time stamps of the data instances. A distance is determined to a particular predetermined location from a location coordinate corresponding to the data instances of a first one or more of the plurality of clusters and the first one or more of the plurality of clusters is correlated with the particular predetermined location in response to the distance being less than a predetermined distance. The particular predetermined location is preferably correlated with for example, a retail store, restaurant, event location, place of commerce or any venue. A distance to a plurality of predetermined locations can be determined from a particular cluster, wherein a one cluster can be correlated with a plurality of predetermined locations. The steps of the method are preferably performed by a coordination system or other suitable system or systems, wherein a computer, having a memory and processor, receives location data via a network.

In the process of partitioning the clusters, the distance is preferably determined between location coordinates of the filtered location data. Clusters are preferably partitioned wherein the location coordinates of any two data instances of the particular cluster are separated by less than a predetermined maximum distance. The predetermined maximum distance is preferably dependent on the geography and demographics of the particular location, wherein more densely populated areas correspond to a lesser predetermined maximum distance and corresponding clusters covering a smaller geographic area. A clusterization algorithm, such as noted above, is preferably employed to partition the collection of tuples, with the condition that for each subset, the distance between any 2 tuples, as defined by the euclidean metric distance between the latitude, longitude of these tuples, is less than some maximal distance, for example 150 meters. The centroid of each cluster, as derived by the average of the latitude, longitude of the tuples in the cluster, is preferably derived.

For a particular cluster to be correlated with a particular predetermined location, it can be further required that a time stamp of one or more location data instances of the particular cluster corresponds to a predetermined time range. For example, a particular predetermined location may correspond to a retail outlet or other place of business open for business only during the hours of 9:00 am to 8:00 pm daily, in which case the predetermined time range can be set to 9:00 am to 8:00 pm daily, wherein a particular cluster is correlated with the location only if at least one of, or at least a predetermined number of, its data instances correspond to a time between 9:00 am to 8:00 pm.

A coordination system of the invention is preferably configured to receive location-related data via an external system, for example a content distribution system through a network.

Filtering the location data preferably includes eliminating from consideration location data instances older than a predetermined length of time as indicated by respective time stamps of the location data. In such manner, data which may be irrelevant due to age is not partitioned into a cluster. Filtering the location data also preferably includes eliminating from consideration location data instances including location coordinates corresponding to one or more measurements having accuracy or precision measured outside a predetermined range.

Optionally input data is normalized. Data normalization is a process in which data attributes within a data model are organized to increase the cohesion of entity types. In other words, the goal of data normalization is to reduce and even eliminate data redundancy. Normalization is typically a refinement process after the initial exercise of identifying the data objects that should be in the database, identifying their relationships, and defining the tables required and the columns within each table within a database.

In one aspect of the invention, initially, images are normalized to a standard size (e.g., 500 pixels by 400 pixels), such as by using conventional downsampling and/or interpolation techniques. Alternate embodiments of the invention utilize any of a variety of other kinds of normalization processing (e.g., intensity, contrast, color balance) in addition to, or instead of, such size normalization. Still further embodiments omit normalization processing altogether. In embodiments where normalization processing is used, such processing preferably is fully automated, so that it can be implemented in software or in any of the other ways described herein.

Wherein images are normalized, keypoints and associated descriptor vectors may be extracted from the normalized image (or the original image if no normalization processing has been performed) and used to generate a set of features, preferably in a fully automated manner. In this regard, any conventional keypoint-detection technique can be used. Examples include a Laplacian-of-Gaussian (LoG) detector, a Harris corners detector or a maximally-stable extremal regions (MSERs) detector. Similarly, any conventional technique for generating the descriptor vectors can be used.

In the preferred embodiments, any or all of the following pieces of data are determined for each keypoint:

1. The (x, y) coordinates of the keypoint.
2. The keypoint descriptor, which typically is a mathematical object (such as a vector in n-dimensional space).

3. The keypoint orientation, which is an angle associated with the descriptor, typically relative to the x axis of the photograph, usually showing the direction of the maximum gradient of the pixel values.

4. The keypoint scale, which determines the granularity of the photograph information used for creating the keypoint. Higher scale uses coarser grain features, and smaller scale uses finer grain features. Scale typically also determines the size of the area around the keypoint that is encompassed by the descriptor.

DETAILED DESCRIPTION OF DRAWINGS

FIG. 1 places the new invention (11) into context of an existing process (1-10, 12-13).

1. Input.

Input can have deterministic search parameters, semi-deterministic search parameters and context data.

Deterministic search parameters may include, but are not limited to:

Email, username/id of a social network.

Semi-deterministic search parameters may include, but are not limited to:

Name, location (address, geo coordinates, city), company, phone, related people (spouse, parent, child, roommate, workmate, classmate, friend) names, photo.

Context data may include, but are not limited to:

Authorization tokens of the social networks for the user performing the search, location of the user performing the search.

2. Data Normalizer.

Normalize inputs, for example, phone numbers require normalization for area code and number, names need to parsed to first name and last name, addresses need to be parsed to country, state, city, street and geo coordinates.

3. Search Dispatcher.

Dispatch and parallelize search requests.

4. Twitter Search.

Search Twitter API for matched users using name, username or id for user profile, including tweets, followers and friends.

5. Instagram Search.

Search Instagram API for matched users using name, username or id for user profile, including posts, followers and friends.

6. Other social networks.

Search other social networks, including but not limited to: Facebook, LinkedIn, Foursquare, GooglePlus, WordPress.

7. NCOA search.

Search National Change of Address database, which may be provided by third parties such as Whitepages or Pipl.

8. Bing search.

Search Bing API with name and company.

9. Other search providers.

Query other search providers, including but not limited to: LinkedIn, Fullcontact, Pipl, Fliptop.

10. Synchronizer.

As search requests are sent in parallel, they need to be synchronized and time-limited by the synchronizer.

11. Data merger—represents new process introduced to existing process flow as a result of the invention.

Merge all data from new image recognition and geolocation search algorithms. See FIG. 2 for detailed explanation.

12. New data.

Check for new data. If new searchable data is available, feed data back into normalizer and initiate a recursive search.

13. Output.

Outputs include, but are not limited to:

Name, gender, age, current address, history of addresses, current phone number, history of phone numbers, companies, titles, positions, social network profiles, photos, related people, social footprints related to the search context.

Figure 2:
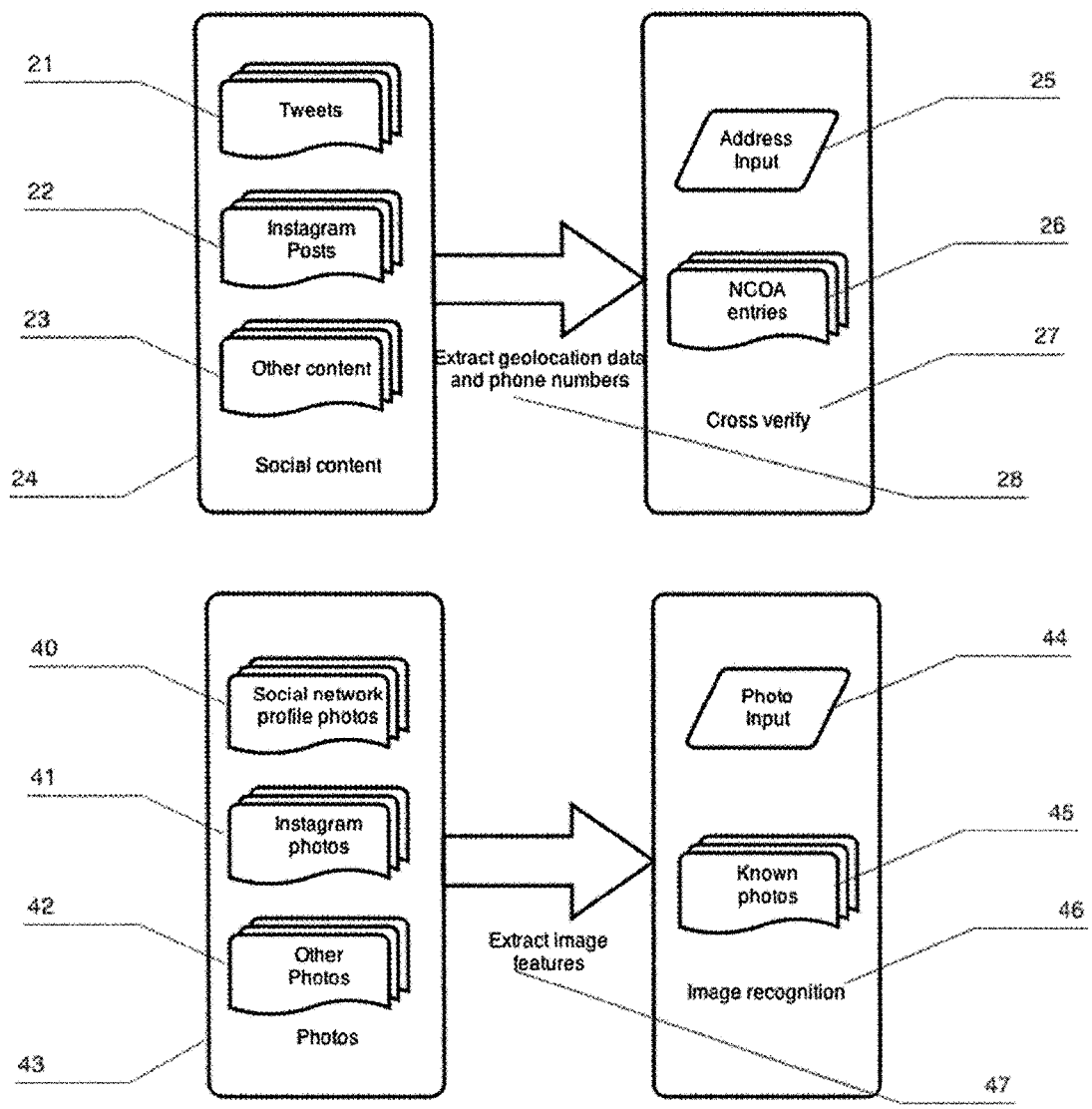
FIG. 2 is a flow chart showing a drill-down view of two core aspects of the method of the invention, specifically within "Data Merger" and the employment of geolocation data (#21-28) and image recognition data (#40-47)

FIG. 2 illustrates a drill-down view of Data Merger process, detailing proprietary use of geolocation data (#21-28) and image recognition methods (#40-47).

21. Tweets.

Analysis of individual tweets from user's Twitter stream, which may mention the user's phone number, email address, links to other social network profiles, or may be tagged with geo coordinates.

22. Instagram posts.

Analysis of Instagram posts, which may be tagged with geo coordinates.

23. Other social content.

Analysis of content posted by user on other social sites, which may include but are not limited to Facebook posts, WordPress blogs.

25. Address input.

Addresses input by the user, or from previous search iterations.

26. NCOA entries.

National Change of Address entries which contain phone numbers, which in turn can be converted to geo coordinates.

27. Cross verify.

Cross verify with geo coordinates.

28. Extract phone and geo coordinates.

Extract phone numbers and geo coordinates from social content.

40. Social network profile photos.

Profile photos from social networks, including but not limited to: Facebook, Twitter, LinkedIn, Googleplus, Instagram, Klout.

41. Instagram photos.

Photos posted on Instagram.

42. Extract image features.

44. Photo Input.

Photo input by the user or from previous search iterations.

45. Known photos.

Photo from social networks which can be directly identify by deterministic search parameters such as a userid or username.

46. Image recognition.

Set query image and analyze possible matches for commonality.

Figure 3:
FIG. 3 is photographic depiction of a determination of local image features leading to a correctly matched image descriptors in an image recognition method.

FIG. 3 is a depiction of the effort to match key image descriptors in image recognition process.

FIG. 4 is a depiction of the confidence scoring and matching of query image with possible image matches in duplicate or near duplicate image scenario.

FIG. 5 is a depiction of the confidence scoring and matching of query image with possible image matches in altered image scenario.

FIG. 6 illustrates a delivery of a sample user's social identity graph data to client via web-based interactive user interface. The invention impacts the final output in three ways: a) improves the ability to first find a social median profile belonging to the user, b) assists in the discovery of other social network profiles belonging to the user, and c) contributes to the richness of detail contained in the user's social identity graph.

1. Display of identification of user and initiating social handle.
2. Large display of user photo obtained from social profile(s).
3. Scrolling display of other social networks found belonging to the user.
4. Summary of key social insights that are relevant to the client about the user.
5. In certain deployments of the solution, social identity data can be automatically cross-referenced with customer data housed in the client's database, allowing for near instantaneous matching of a social user with specific customers.
6. Based on geolocation signal analysis and other inputs, a user's location can be determined and displayed, both in text and in cartographical formats. Location data is also used in this case to provide additional insights about the user's environment, such as weather information and city factoids.
7. The user's contact details are displayed in certain cases (e.g., when the client is using a manual process to match social users with customers).
8. Relevant social conversations and engagements between the client and the social user are displayed. The set of relevant conversations may be extended to include engagements between the social user and the client's competitor(s), engagements centered around the appearance of certain keywords or phrases, or other parameters determined by the client.
9. Basic Twitter activity metrics related to the social user are displayed.
10. If the social user is connected on social networks to notable persons or accounts in the client's sphere, they are displayed here.
11. The user's influence score and influence tags supplied by Klout are displayed in the interface.

The contents of all of the following are incorporated herein by reference:

G. Carmichael, R. Laganière and P. Bose, "Global Context Descriptors for SURF and MSER Feature Descriptors," 2010 Canadian Conference on Computer and Robot Vision, Ottawa, ON, 2010, pp. 309-316.
S. Leutenegger, M. Chli and R. Y. Siegwart, "BRISK: Binary Robust invariant scalable keypoints," 2011 International Conference on Computer Vision, Barcelona, S P, 2011, pp. 2548-2555.
B. Han, P. Cook, and T. Baldwin, "Geolocation Prediction in Social Media Data by Finding Location Indicative Words" Proceedings of COLING 2012: Technical Papers, pages 1045-1062, COLING 2012, Mumbai, December 2012.

Basic Computer Architecture. Computer-readable medium is an electronic holding place or storage for information so that the information can be accessed by processor as known to those skilled in the art. Computer-readable medium can include, but is not limited to, any type of random access memory (RAM), any type of read only memory (ROM), any type of flash memory, etc. such as magnetic storage devices (e.g., hard disk, floppy disk, magnetic strips, . . . ), optical discs (e.g., CD, DVD, . . . ), smart cards, flash memory devices, etc. User device may have one or more computer-readable media that use the same or a different memory media technology. User device also may have one or more drives that support the loading of a memory media such as a CD or DVD. Computer-readable medium may provide the electronic storage medium for database that may optionally be stored on user device.

Communication interface provides an interface for receiving and transmitting data between devices using various protocols, transmission technologies, and media as known to those skilled in the art. Communication interface may support communication using various transmission media that may be wired or wireless. User device may have one or more communication interfaces that use the same or a different communication interface technology. Data and messages may be transferred between user system and data processing system and/or between another user system or the plurality of user systems using communication interface.

A processor executes instructions as known to those skilled in the art. The instructions may be carried out by a special purpose computer, logic circuits, or hardware circuits. Thus, processor may be implemented in hardware, firmware, or any combination of these methods and/or in combination with software. The term "execution" is the process of running an application or the carrying out of the operation called for by an instruction. The instructions may be written using one or more programming language, scripting language, assembly language, etc. Processor executes an instruction, meaning that it performs/controls the operations called for by that instruction. Processor operably couples with output interface, with input interface, with computer-readable medium, and with communication interface to receive, to send, and to process information. Processor may retrieve a set of instructions from a permanent memory device and copy the instructions in an executable form to a temporary memory device that is generally some form of RAM. User device may include a plurality of processors that use the same or a different processing technology.

Output interface provides an interface for outputting information for review by users. For example, output interface may include an interface to display, speaker, printer etc. . . . . Display may be a thin film transistor display, a light emitting diode display, a liquid crystal display, or any of a variety of different displays known to those skilled in the art. Speaker may be any of a variety of speakers as known to those skilled in the art. Printer may be any of a variety of printers as known to those skilled in the art. User device may have one or more output interfaces that use the same or a different interface technology. Display, speaker, and/or printer further may be accessible by a user device through communication interface.

The systems and methods described herein rely on a variety of computer systems, networks and/or digital devices for operation. As will be appreciated by those skilled in the art, computing systems and web-based cross-platforms include non-transitory computer-readable storage media for tangibly storing computer readable instructions. In order to fully appreciate how the web-based cross-platform smart phone application creation and management system operates an understanding of suitable computing systems is useful. The web-based searching and data mining disclosed herein are enabled as a result of an application operable via a suitable computing system.

In one aspect, a computer system (or digital device), which may be understood as a logic apparatus adapted and configured to read instructions from media and/or network port, is connectable to a server and can have a fixed media. The computer system can also be connected to the Internet or an intranet. The system includes central processing unit (CPU), disk drives, optional input devices, such as a keyboard and/or mouse and optional monitor. Data communication can be achieved through, for example, communication medium to a server at a local or a remote location. The communication medium can include any suitable means of transmitting and/or receiving data. For example, the communication medium can be a network connection, a wireless connection or an Internet connection.

It is envisioned that data relating to the present disclosure can be transmitted over such networks or connections. The computer system can be adapted to communicate with a participant and/or a device used by a participant. The computer system is adaptable to communicate with other computers over the Internet, or with computers via a server. Each computing device (including mobile devices) includes an operating system (OS), which is software, that consists of software programs and data that runs on the devices, manages the device hardware resources, and provides common services for execution of various application software. The operating system enables an application program to run on the device.

As will be appreciated by those skilled in the art, a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

A user launches an app created by an app creator and downloaded to the user's mobile device to view digital content items and can connect to a front end server via a network, which is typically the Internet, but can also be any network, including but not limited to any combination of a LAN, a MAN, a WAN, a mobile, wired or wireless network, a private network, or a virtual private network. As will be understood, very large numbers (e.g., millions) of users are supported and can be in communication with the website via an app at any time. The user may include a variety of different computing devices Application delivery platform, as illustrated, via network topology and/or cloud, can be in continuous and/or operative or sporadic and/or intermittent communication with a plurality of user devices and utilizing over the air (OTA) data interchange technologies and/or mechanisms. As will be appreciated by those of reasonable skill in the art, mobile devices as may be used in consumer communications can include a disparity of different, diverse and/or disparate portable devices including Tablet PC's, server class portable computing machines and/or databases, laptop computers, notebook computers, cell phones, smart phones, transportable handheld consumer appliances and/or instrumentation, portable industrial devices and/or components, personal digital assistants, multimedia Internet enabled phones, multimedia players, and the like.

Network topology and/or cloud can include any viable communication and/or broadcast technology, for example, wired and/or wireless modalities and/or technologies can be utilized to effectuate the claimed subject matter. Moreover, network topology and/or cloud can include utilization of Personal Area Networks (PANs), Local Area Networks (LANs), Campus Area Networks (CANs), Metropolitan Area Networks (MANs), extranets, intranets, the Internet, Wide Area Networks (WANs)—both centralized and/or distributed—and/or any combination, permutation, and/or aggregation thereof. Furthermore, as those skilled in the art will appreciate and understand various data communications protocols (e.g., TCP/IP, Ethernet, Asynchronous Transfer Mode (ATM), Fiber Distributed Data Interface (FDDI), Fibre Channel, Fast Ethernet, Gigabit Ethernet, Wi-Fi, Token Ring, Frame Relay, etc.) can be utilized to implement suitable data communications.

Additionally, application delivery server/platform may include a provisioning component that, based at least in part on input received from a portal component, can automatically configure and/or provision the various disparate mobile devices with appropriate applications.

It is to be appreciated that a store can be, for example, volatile memory or non-volatile memory, or can include both volatile and non-volatile memory. By way of illustration, and not limitation, non-volatile memory can include read-only memory (ROM), programmable read only memory (PROM), electrically programmable read only memory (EPROM), electrically erasable programmable read only memory (EEPROM), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink® DRAM (SLDRAM), Rambus® direct RAM (RDRAM), direct Rambus® dynamic RAM (DRDRAM) and Rambus® dynamic RAM (RDRAM). Store 206 of the subject systems and methods is intended to comprise, without being limited to, these and any other suitable types of memory. In addition, it is to be appreciated that the store can be a server, a database, a hard drive, and the like.

Server Modules, Components, and Logic.

Certain embodiments are described herein as including logic or a number of modules, components or mechanisms. A module, logic, component or mechanism (hereinafter collectively referred to as a "module") may be a tangible unit capable of performing certain operations and is configured or arranged in a certain manner. In example embodiments, one or more computer systems (e.g., server computer system) or one or more components of a computer system (e.g., a processor or a group of processors) may be configured by software (e.g., an application or application portion) as a "module" that operates to perform certain operations as described herein.

In various embodiments, a "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations.

Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The invention can be implemented in numerous ways, including as a process, an apparatus, a system, a computer readable medium such as a computer readable storage medium or a computer network wherein program instructions are sent over optical or communication links. In this specification, these implementations, or any other form that the invention may take, may be referred to as systems or techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

The following discussion provides a brief and general description of a suitable computing environment in which various embodiments of the system may be implemented. Although not required, embodiments will be described in the general context of computer-executable instructions, such as program applications, modules, objects or macros being executed by a computer. Those skilled in the relevant art will appreciate that the invention can be practiced with other computing system configurations, including hand-held devices, multiprocessor systems, microprocessor-based or programmable consumer electronics, personal computers ("PCs"), network PCs, mini-computers, mainframe computers, mobile phones, personal digital assistants, smart phones, personal music players (like iPod) and the like. The embodiments can be practiced in distributed computing environments where tasks or modules are performed by remote processing devices, which are linked through a communications network. In a distributed computing environment, program modules may be located in both local and remote memory storage devices.

As used herein, the terms "computer" and "server" are both computing systems as described in the following. A computing system may be used as a server including one or more processing units, system memories, and system buses that couple various system components including system memory to a processing unit. Computing system will at times be referred to in the singular herein, but this is not intended to limit the application to a single computing system since in typical embodiments, there will be more than one computing system or other device involved. Other computing systems may be employed, such as conventional and personal computers, where the size or scale of the system allows. The processing unit may be any logic processing unit, such as one or more central processing units ("CPUs"), digital signal processors ("DSPs"), application-specific integrated circuits ("ASICs"), etc. Unless described otherwise, the construction and operation of the various components are of conventional design. As a result, such components need not be described in further detail herein, as they will be understood by those skilled in the relevant art.

The computing system includes a system bus that can employ any known bus structures or architectures, including a memory bus with memory controller, a peripheral bus, and a local bus. The system also will have a memory which may include read-only memory ("ROM") and random access memory ("RAM"). A basic input/output system ("BIOS"), which can form part of the ROM, contains basic routines that help transfer information between elements within the computing system, such as during startup.

The computing system also includes non-volatile memory. The non-volatile memory may take a variety of forms, for example a hard disk drive for reading from and writing to a hard disk, and an optical disk drive and a magnetic disk drive for reading from and writing to removable optical disks and magnetic disks, respectively. The optical disk can be a CD-ROM, while the magnetic disk can be a magnetic floppy disk or diskette. The hard disk drive, optical disk drive and magnetic disk drive communicate with the processing unit via the system bus. The hard disk drive, optical disk drive and magnetic disk drive may include appropriate interfaces or controllers coupled between such drives and the system bus, as is known by those skilled in the relevant art. The drives, and their associated computer-readable media, provide non-volatile storage of computer readable instructions, data structures, program modules and other data for the computing system. Although computing systems may employ hard disks, optical disks and/or magnetic disks, those skilled in the relevant art will appreciate that other types of non-volatile computer-readable media that can store data accessible by a computer may be employed, such a magnetic cassettes, flash memory cards, digital video disks ("DVD"), Bernoulli cartridges, RAMs, ROMs, smart cards, etc.

Various program modules or application programs and/or data can be stored in the system memory. For example, the system memory may store an operating system, end user application interfaces, server applications, and one or more application program interfaces ("APIs").

The system memory also includes one or more networking applications, for example a Web server application and/or Web client or browser application for permitting the computing system to exchange data with sources, such as clients operated by users and members via the Internet, corporate Intranets, or other networks as described below, as well as with other server applications on servers such as those further discussed below. The networking application in the preferred embodiment is markup language based, such as hypertext markup language ("HTML"), extensible markup language ("XML") or wireless markup language ("WML"), and operates with markup languages that use syntactically delimited characters added to the data of a document to represent the structure of the document. A number of Web server applications and Web client or browser applications are commercially available, such as those available from Mozilla and Microsoft.

The operating system and various applications/modules and/or data can be stored on the hard disk of the hard disk drive, the optical disk of the optical disk drive and/or the magnetic disk of the magnetic disk drive.

A computing system can operate in a networked environment using logical connections to one or more client computing systems and/or one or more database systems, such as one or more remote computers or networks. The computing system may be logically connected to one or more client computing systems and/or database systems under any known method of permitting computers to communicate, for example through a network such as a local area network ("LAN") and/or a wide area network ("WAN") including, for example, the Internet. Such networking environments are well known including wired and wireless enterprise-wide computer networks, intranets, extranets, and the Internet. Other embodiments include other types of communication networks such as telecommunications networks, cellular networks, paging networks, and other mobile networks. The information sent or received via the communications channel may, or may not be encrypted. When used in a LAN networking environment, the computing system is connected to the LAN through an adapter or network interface card (communicatively linked to the system bus). When used in a WAN networking environment, the computing system may include an interface and modem (not shown) or other device, such as a network interface card, for establishing communications over the WAN/Internet.

In a networked environment, program modules, application programs, or data, or portions thereof, can be stored in the computing system for provision to the networked computers. In one embodiment, the computing system is communicatively linked through a network with TCP/IP middle layer network protocols; however, other similar network protocol layers are used in other embodiments, such as user datagram protocol ("UDP"). Those skilled in the relevant art will readily recognize that these network connections are only some examples of establishing communications links between computers, and other links may be used, including wireless links.

While in most instances the computing system will operate automatically, where an end user application interface is provided, an operator can enter commands and information into the computing system through an end user application interface including input devices, such as a keyboard, and a pointing device, such as a mouse. Other input devices can include a microphone, joystick, scanner, etc. These and other input devices are connected to the processing unit through the end user application interface, such as a serial port interface that couples to the system bus, although other interfaces, such as a parallel port, a game port, or a wireless interface, or a universal serial bus ("USB") can be used. A monitor or other display device is coupled to the bus via a video interface, such as a video adapter (not shown). The computing system can include other output devices, such as speakers, printers, etc.

The present methods, systems and articles also may be implemented as a computer program product that comprises a computer program mechanism embedded in a computer readable storage medium. For instance, the computer program product could contain program modules. These program modules may be stored on CD-ROM, DVD, magnetic disk storage product, flash media or any other computer readable data or program storage product. The software modules in the computer program product may also be distributed electronically, via the Internet or otherwise, by transmission of a data signal (in which the software modules are embedded) such as embodied in a carrier wave.

For instance, the foregoing detailed description has set forth various embodiments of the devices and/or processes via the use of examples. Insofar as such examples contain one or more functions and/or operations, it will be understood by those skilled in the art that each function and/or operation within such examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, flash drives and computer memory; and transmission type media such as digital and analog communication links using TDM or IP based communication links (e.g., packet links).

Further, in the methods taught herein, the various acts may be performed in a different order than that illustrated and described. Additionally, the methods can omit some acts, and/or employ additional acts. As will be apparent to those skilled in the art, the various embodiments described above can be combined to provide further embodiments. Aspects of the present systems, methods and components can be modified, if necessary, to employ systems, methods, components and concepts to provide yet further embodiments of the invention. For example, the various methods described above may omit some acts, include other acts, and/or execute acts in a different order than set out in the illustrated embodiments.

These and other changes can be made to the present systems, methods and articles in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

While certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

We claim:

1. A non-transitory computer readable medium having stored thereon computer-executable instructions, the computer executable instructions causing a processor to execute a method of creating an integrated, collated social media profile for a person which comprises:
   a) probing social media outlets and channels using one or more of social media application programming interfaces (APIs), data provided by third party data compilers, data aggregated directly from web crawlers, using selected person-specific search parameters and person specific context data to form a social media data stream;
   b) from the social media data stream, identifying at least one photographic image from a first social media channel and at least one photographic image from a second social media channel;
   c) comparing the at least one photographic image from the first social media channel and the at least one photographic image from the second social media channel via a plurality of image recognition steps, comprising for each image: i) creating a 64 bit signature hash; ii) converting the image down to 9×8 pixels to remove unrequired details and to produce a low frequency 9×8 image to ensure that different scaling and stretching will not affect a hash; iii) converting the low frequency 9×8 image into greyscale to simplify further computation; iv) computing a greyscale colour difference between each pixel next to each other in each row of pixels, wherein each row will produce eight difference values for a total of 64 values; v) creating a 64 bit hash wherein each bit is set to 0 or 1 depending on whether the respective left pixel is brighter than the right pixel and vi) comparing two images using Hamming distance to produce global image comparison output;
   d) comparing the global image comparison output to a threshold to produce a set of resultant global images, wherein the set of resultant global images comprises at least one pair of photographic images from the first social media channel and the second social media channel of the at least one photographic image from the first social media channel and the at least one photographic image from the second social media channel having a global image comparison output less than the threshold;
   e) comparing the set of resultant global images from the first social media channel and the set of resultant global images from the second social media channel via a plurality of image recognition steps, comprising for each image, i) identifying one or more features/keypoints; ii) assigning descriptors to the one or more features/keypoints so that they can be recognized and compared to other images; iii) weighing the one or more features/keypoints; iv) matching the one or more features/keypoints;
   f) from the social media data stream, i) identifying a plurality of geolocation data inputs related to the person and/or social media connections of the person; ii) performing a centroid-based analysis on the plurality of geolocation data inputs to form clusters; iii) classifying and filtering the clusters; and iv) selecting one or more probable locations of the person based upon the clusters; and
   g) determining and corroborating with confidence the photographic images and the geolocation data inputs which are assignable to the person and creating the integrated, collated social media profile, displayable on a dashboard, for the person, wherein the integrated, collated social media profile for the person comprises at least one matched photographic image of the set of resultant global images.

2. The non-transitory computer readable medium of claim 1 wherein comparisons between all descriptors in a pair of images are conducted, distances are sorted according to Hamming distance (d(n)) and an overall score(s) for the image is determined by first sorting all the distances in ascending order as follows:

$$s = \sum_{n=0}^{N} w(n)d(n)$$

wherein a sigmoid weighting (w(n)) is applied to these distances to emphasize the effect of top scoring close matches, while limiting the nuisance effects of large outlier match distances:

$$w(n) = \frac{1}{1 + \exp(5 - 2n)}$$

wherein a weighted average distance is converted into a probability of match (P(match/s)), by obtaining a probabilistic output via another sigmoid mapping as follows:

$$P(\text{match} \mid s) = \frac{1}{1 + \exp(As + B)}.$$

3. The non-transitory computer readable medium of claim 1 wherein the selected person-specific search parameters are deterministic and are selected from the group consisting of email address, usernames, identification codes and other recognition entry points to a social network related to the person.

4. The non-transitory computer readable medium of claim 1 wherein the selected person-specific search parameters are semi-deterministic and are selected from the group consisting of names, locations (address, geo coordinates, city), companies, phone numbers, related people (spouse, parent, child, roommate, workmate, classmate, friend), personal names and photographs.

5. The non-transitory computer readable medium of claim 1 wherein the selected person-specific search parameters comprises context data selected from the group consisting of authorization tokens for the social networks associated with a search, and a location associated with the search.

6. The non-transitory computer readable medium of claim 1 wherein geolocation data inputs related to the person comprise at least one of:
EXIF geotag data from one or more publicly posted photos;
data from websites that append geo-coordinates in meta data;
third party social media sites that append location data to user posts;
social media that include user phone numbers in profiles, bios, or posts; and
social media that include location data in profiles, bios, or posts.

7. The non-transitory computer readable medium of claim 1 wherein the plurality of geolocation data inputs at step f) related to the person are cross-referenced with the at least one time cue and/or spatial cue selected from the group consisting of time of day that a given post was created, data relating to post clustering, data relating to outlier extractions, outputs from an analysis of natural language for location clues and outputs from an analysis of the person's social networks.

8. The non-transitory computer readable medium of claim 1 wherein the plurality of geolocation data inputs at step f) related to the person are cross-referenced with at least one other time cue and/or spatial cue.

9. The non-transitory computer readable medium of claim 1 wherein geolocation data inputs comprise artifacts selected from the group comprising one or more online profiles of the person, online social media posts of the person, images (photographic and video) posted online of or by the person, one or more online profiles of a social media connection of the person, online social media posts of a social media connection of the person, images (photographic and video) posted online of or by a social media connection of the person.

10. The non-transitory computer readable medium of claim 7, wherein the computer executable instructions further cause the processor to perform the following operations, comprising:
producing at least one possible location for the person based on the plurality of cross-referenced geolocation data inputs; and
triangulating the at least one possible location against at least one other data source.

11. The non-transitory computer readable medium of claim 10, wherein the at least one other data source further comprises at least one of: known address information for the person, national change of address database, address registry, marriage registry, general web search, or a third party vendor.

12. The non-transitory computer readable medium of claim 1 wherein identifying the one or more features/keypoints comprises determining local image features that are identifiable through one more image transformations.

13. The non-transitory computer readable medium of claim 1 wherein identifying the one or more features/keypoints comprises determining local image features using Maximally Stable Extremal Regions (MSER).

14. The non-transitory computer readable medium of claim 1 wherein the one or more features/keypoints comprise a salient area encompassing a feature or keypoint.

15. The non-transitory computer readable medium of claim 1 wherein the descriptors comprise binary descriptors for efficient comparison and matching.

16. The non-transitory computer readable medium of claim 1 wherein the descriptors comprise Binary Robust Invariant Scalable Keypoint ("BRISK") descriptors.

17. A non-transitory computer readable medium having stored thereon computer-executable instructions, the computer executable instructions causing a processor to execute a method of creating an integrated, collated social media profile for a person which comprises:
a) probing social media outlets and channels using one or more of social media application programming interfaces (APIs), data provided by third party data compilers, data aggregated directly from web crawlers, using selected person-specific search parameters and person specific context data to form a social media data stream;
b) from the social media data stream, identifying at least one photographic image from a first social media channel and at least one photographic image from a second social media channel;
c) comparing the at least one photographic image from the first social media channel and the at least one photographic image from the second social media channel via a plurality of image recognition steps, comprising for each image: i) converting the image down to 8×8 pixels to remove unrequired details and to produce a low frequency image with 64 total pixels; ii) converting the 8×8 pixels into grey scale values to simplify further computation; iii) computing a mean value for all of the 8×8 pixels; iv) creating a 64 bit hash where each bit is set to 0 or 1 depending on whether the grey scale value is above or below the mean value; v) comparing two images using Hamming distance to produce a global image comparison output;
d) comparing the global image comparison output to a threshold to produce a set of resultant global images, wherein the set of resultant global images comprises at least one pair of photographic images from the first social media channel and the second social media channel of the at least one photographic image from the first social media channel and the at least one photographic image from the second social media channel having a global image comparison output less than the threshold;
e) comparing the set of resultant global images from the first social media channel and the set of resultant global images from the second social media channel via a plurality of image recognition steps, comprising for each image, i) identifying one or more features/keypoints; ii) assigning descriptors to the one or more features/keypoints so that they can be recognized and compared to other images; iii) weighing the one or more features/keypoints; iv) matching the one or more features/keypoints;

f) from the social media data stream, i) identifying a plurality of geolocation data inputs related to the person and/or social media connections of the person; ii) performing a centroid-based analysis on the plurality of geolocation data inputs to form clusters; iii) classifying and filtering the clusters; and iv) selecting one or more probable locations of the person based upon the clusters; and g) determining and corroborating with confidence the photographic images and the geolocation data inputs which are assignable to the person and creating the integrated, collated social media profile, displayable on a dashboard, for the person, wherein the integrated, collated social media profile for the person comprises at least one matched photographic image of the set of resultant global images.

18. The non-transitory computer readable medium of claim 17, wherein comparisons between all descriptors in a pair of images are conducted, distances are sorted according to Hamming distance (d(n)) and an overall score (s) for the image is determined by first sorting all the distances in ascending order as follows:

$$s = \sum_{n=0}^{N} w(n)d(n)$$

wherein a sigmoid weighting (w(n)) is applied to these distances to emphasize the effect of top scoring close matches, while limiting the nuisance effects of large outlier match distances:

$$w(n) = \frac{1}{1 + \exp(5 - 2n)}$$

wherein a weighted average distance is converted into a probability of match (P(match/s), by obtaining a probabilistic output via another sigmoid mapping as follows:

$$P(\text{match} \mid s) = \frac{1}{1 + \exp(As + B)}.$$

19. A non-transitory computer readable medium having stored thereon computer-executable instructions, the computer executable instructions causing a processor to execute a method of creating an integrated, collated social media profile for a person which comprises:

a) probing social media outlets and channels using one or more of social media application programming interfaces (APIs), data provided by third party data compilers, data aggregated directly from web crawlers, using selected person-specific search parameters and person specific context data to form a social media data stream;

b) from the social media data stream, identifying at least one photographic image from a first social media channel and at least one photographic image from a second social media channel;

c) comparing the at least one photographic image from the first social media channel and the at least one photographic image from the second social media channel via a plurality of image recognition steps, comprising for each image: i) converting the image down to 32×32 pixels in order to simplify Discrete Cosine Transform (DCT) computation; ii) computing the DCT of the 32×32 image to produce a 32×32 collection of frequency scalars; iii) selecting the top left 8×8 scalars and disregarding remaining scalars; iv) computing a mean average of the selected DCT scalars; v) creating a 64 bit hash where each bit is set to 0 or 1 depending on whether each of the 64 DCT scalars is above or below the mean average; vi) comparing two images using Hamming distance to produce a global image comparison output;

d) comparing the global image comparison output to a threshold to produce a set of resultant global images, wherein the set of resultant global images comprises at least one pair of photographic images from the first social media channel and the second social media channel of the at least one photographic image from the first social media channel and the at least one photographic image from the second social media channel having a global image comparison output less than the threshold;

e) comparing the set of resultant global images from the first social media channel and the set of resultant global images from the second social media channel via a plurality of image recognition steps, comprising for each image, i) identifying one or more features/keypoints; ii) assigning descriptors to the one or more features/keypoints so that they can be recognized and compared to other images; iii) weighing the one or more features/keypoints; iv) matching the one or more features/keypoints;

f) from the social media data stream, i) identifying a plurality of geolocation data inputs related to the person and/or social media connections of the person; ii) performing a centroid-based analysis on the plurality of geolocation data inputs to form clusters; iii) classifying and filtering the clusters; and iv) selecting one or more probable locations of the person based upon the clusters; and g) determining and corroborating with confidence the photographic images and the geolocation data inputs which are assignable to the person and creating the integrated, collated social media profile, displayable on a dashboard, for the person, wherein the integrated, collated social media profile for the person comprises at least one matched photographic image of the set of resultant global images.

20. The non-transitory computer readable medium of claim 19, wherein comparisons between all descriptors in a pair of images are conducted, distances are sorted according to Hamming distance (d(n)) and an overall score (s) for the image is determined by first sorting all the distances in ascending order as follows:

$$s = \sum_{n=0}^{N} w(n)d(n)$$

wherein a sigmoid weighting (w(n)) is applied to these distances to emphasize the effect of top scoring close matches, while limiting the nuisance effects of large outlier match distances:

$$w(n) = \frac{1}{1+\exp(5-2n)}$$

wherein a weighted average distance is converted into a probability of match (P(match/s), by obtaining a probabilistic output via another sigmoid mapping as follows:

$$P(\text{match} \mid s) = \frac{1}{1+\exp(As+B)}.$$

* * * * *